United States Patent
Arruda et al.

(10) Patent No.: US 6,419,755 B1
(45) Date of Patent: Jul. 16, 2002

(54) CHEMICAL DELACQUERING PROCESS

(75) Inventors: Doris Arruda, Monroeville; Kathleen M. Tomaswick, Natrona Heights, both of PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 09/475,845

(22) Filed: Dec. 30, 1999

(51) Int. Cl.⁷ .................................. C23G 1/02
(52) U.S. Cl. ....................... 134/3; 134/2; 134/19; 134/30; 134/41; 510/201; 510/202; 510/241; 510/242; 510/245; 510/254; 510/434; 510/477
(58) Field of Search ........................... 134/2, 3, 19, 30, 134/41; 570/254, 201, 202, 241, 242, 245, 434, 477

(56) References Cited

U.S. PATENT DOCUMENTS

| | | | |
|---|---|---|---|
| 3,997,336 A | 12/1976 | van Linden et al. ......... 75/68 R |
| 4,087,370 A | 5/1978 | Singalewitch et al. ...... 252/143 |
| 4,128,415 A | 12/1978 | van Linden et al. ........ 75/65 R |
| 4,244,792 A * | 1/1981 | Baldwin ...................... 204/58 |
| 4,481,061 A * | 11/1984 | Ross ........................... 156/345 |
| 4,980,076 A * | 12/1990 | Tanaka et al. .............. 252/79.4 |
| 4,983,216 A | 1/1991 | van Linden et al. .......... 75/672 |
| 5,232,489 A * | 8/1993 | Mertens-Gottselig ........ 75/715 |
| 5,232,619 A * | 8/1993 | Sue ............................. 252/102 |
| 5,259,960 A * | 11/1993 | Beck et al. .................. 210/638 |
| 5,290,362 A | 3/1994 | Sue ............................... 134/2 |
| 5,310,496 A * | 5/1994 | Taylor ......................... 252/171 |
| 5,391,234 A * | 2/1995 | Murphy ....................... 134/38 |
| 5,423,922 A | 6/1995 | Kirk ............................. 134/38 |
| 5,494,603 A | 2/1996 | Kirk ........................ 252/174.21 |
| 5,669,980 A * | 9/1997 | McNeil et al. .................. 134/3 |
| 5,707,697 A * | 1/1998 | Spain et al. ................... 428/31 |
| 5,763,377 A | 6/1998 | Dobrez et al. ............... 510/201 |
| 5,817,163 A | 10/1998 | Wood ........................... 75/403 |
| 5,977,041 A * | 11/1999 | Honda ......................... 510/175 |
| 6,093,657 A * | 7/2000 | Ohkubo et al. ............. 438/745 |

OTHER PUBLICATIONS

Fujisawa et al., "Swell–Peeling Method For Paints On Aluminum Cans," *Metallurgical Review of MMIJ*, vol. 16, No. 1, pp. 15–22 (1999).

Patent Abstracts of Japan; Publication No. 10068024, dated Oct. 3, 1998; Application No. 09085395, dated Mar. 4, 1997; European Patent Office. Applicant: Fukuoka Alum Kogyo KK; Inventor: Fukuda Minoru; Int. Class: C22B; and entitled "Method for Recycling Aluminum Scrap".

\* cited by examiner

Primary Examiner—Sharidan Carrillo
(74) Attorney, Agent, or Firm—Barbara E. Johnson; Edward L. Levine

(57) ABSTRACT

A chemical delacquering composition, process and system for delacquering substrates such as aluminum scrap in which an aqueous solution containing at least one short-chain organic acid, preferably a mixture of two short-chain organic acids, and optional components such as surfactants, are contacted onto the substrate(s) with application of heat and agitation. The invention embraces the use of one or more organic acids (carboxylic acids) having a total of 2–12 carbons, preferably 3–8 carbons. Concentration of organic acid by weight ranges from about 0.5–8% per at least one organic acid, or preferably 2–4% for each organic acid component assuming two organic acid components are present. In the preferred embodiment of the invention, about 2–4% each of citric and lactic acids are present in the delacquering composition. Processing temperatures range from 160–212° F., preferably 180–212° F., and most preferably 185–212° F. (higher temperatures may be used in pressurized reactors, although pressurized reactors are not generally necessary).

17 Claims, 2 Drawing Sheets

CHEMICAL DELACQUERING PROCESS

TECHNICAL FIELD

The invention relates generally to a composition of matter, and a method (and system) for using it, for removing coatings of various kinds on aluminum scrap and other substrates prior to or during the recycling process. The composition of matter is aqueous and contains at least one short chain organic acid; the method includes applying the composition to the substrate with the application of heat and agitation.

BACKGROUND OF THE INVENTION

For thirty years or more, aluminum scrap such as shredded mixed "used beverage containers" (UBCs) has been recycled as a cost effective way to manufacture aluminum metal, as contrasted with the refining of aluminum ore. U.S. patents representative of basic recycling technology include, for example, U.S. Pat. No. 3,997,336, U.S. Pat. No. 4,128,415, and U.S. Pat. No. 4,983,216, all to van Linden et al. When shredded mixed UBCs were historically recycled without removal of the coatings thereon, the aluminum recovery during recycling was very poor. An early process for coating removal, which is still in use at this writing, is a thermal delacquering process in which shredded mixed UBCs are subjected to heating to a temperature slightly under the melting point of the aluminum. The high temperatures literally incinerate the coatings so as to remove them, and delacquered shredded mixed UBCs of this type can be recycled with very high recovery of aluminum metal.

Thermal delacquering has at least two major disadvantages, however, as a method for removing coatings from aluminum scrap prior to recycling. First, the gaseous effluent created from what amounts to combustion of the coatings requires further environmental remediation. Also, thermal delacquering of aluminum scrap itself creates a loss of some of the otherwise recyclable metal.

Other prior art efforts to remove coatings have included the use of chemical delacquering compositions. For example, Fujisawa et al., "Swell-Peeling Method for Paints on Aluminum Cans," *Metallurgical Review of Mining and Materials Processing Institute*, vol. 16, no. 1, 1999, discuss the use of methylene chloride alone or in combination with formic acid and/or acetic acid as a composition to promote the swelling, peeling and removal of paints coated on aluminum cans. The combination of methylene chloride, formic acid and halogenated acetic acid is reported to effect better coating removal than can be achieved with methylene chloride alone or methylene chloride in combination with formic acid. Unfortunately, the compositions of Fujisawa et al. and others are plagued by environmental unsuitability. Methylene chloride and formic acid are each both volatile and hazardous, which make handling these materials cumbersome and expensive. Prior art attempts to use methyl ethyl ketone or sulfuric acid created similar environmental obstacles and, ironically, many strong acids such as sulfuric acid proved surprisingly ineffective as delacquering agents.

Certain prior art U.S. patents have addressed the chemical removal of coatings from aluminum or metal scrap. U.S. Pat. No. 5,817,163 to Wood describes a two step process which applies superheated steam @ 1000° F. to the coated scrap prior to traditional thermal delacquering. The superheated steam is disclosed as producing a carbon-containing volatile from the carbon-containing coatings, which carbon-containing volatile can be removed from the spent steam to prevent its fugitive emission. U.S. Pat. No. 5,423,922 and U.S. Pat. No. 5,494,603 to Kirk disclose a delacquering composition containing primarily polyalkylene glycol polymer and an aqueous solution of a smaller amount of a dicarboxylic acid such as oxalic, malonic, succinic, glutaric, or adipic acid (alone or in combination). The disadvantage with superheated steam is its higher energy requirement and inconsistent effectiveness. Polyalkylene glycol polymers are difficult to handle, inasmuch as they require consideration of human exposure issues and waste disposal issues, and would also inevitably partially remain on the metal thus treated. During subsequent heating and melting, any remaining polyalkylene glycol polymer would then likely decompose and release undesirable emission products, and would likely also contribute to unwanted metal oxidation at the same time.

In view of the disadvantages by which the prior art is plagued, the present invention seeks to provide delacquering of coatings from coated aluminum and other scrap or substrates by means of compositions and methods which give improved metal recovery yields and which are environmentally acceptable or optimal.

SUMMARY OF THE INVENTION

In order to meet these goals, the present invention is a chemical delacquering composition and process in which an aqueous solution containing at least one short-chain organic acid, preferably a mixture of two short-chain organic acids, and optional components such as surfactants, are contacted onto coated aluminum (or other substrates) with application of heat and agitation. The invention embraces the use of one or more organic acids (carboxylic acids) having a total of 2–12 carbons, preferably 3–8 carbons. Concentration of organic acid by weight ranges from about 0.5–8% per at least one organic acid, or preferably 2–4% for each organic acid component assuming two organic acid components are present. In the preferred embodiment of the invention, about 2–4% each of citric and lactic acids are present in the delacquering composition. Processing temperatures range from 160–212° F., preferably 180–212° F., and most preferably 185–212° F. (higher temperatures may be used in pressurized reactors, although pressurized reactors are not generally necessary). The shredded mixed UBCs or other substrates to be chemically delacquered are contacted with the composition and—before, during and/or after heating—are stirred, drummed or otherwise agitated to facilitate coating removal. Processing times range from about 12–120 minutes (larger batch sizes required shorter times) and commercial processing times will often fall within the preferred range of 30 minutes to 1 hour. Coatings treated with the present composition and method do not generally dissolve completely but usually delaminate into flecks or leaves of coating material, which may in turn be filtered from the treating composition.

DETAILED DESCRIPTION OF THE INVENTION

Figure 1:
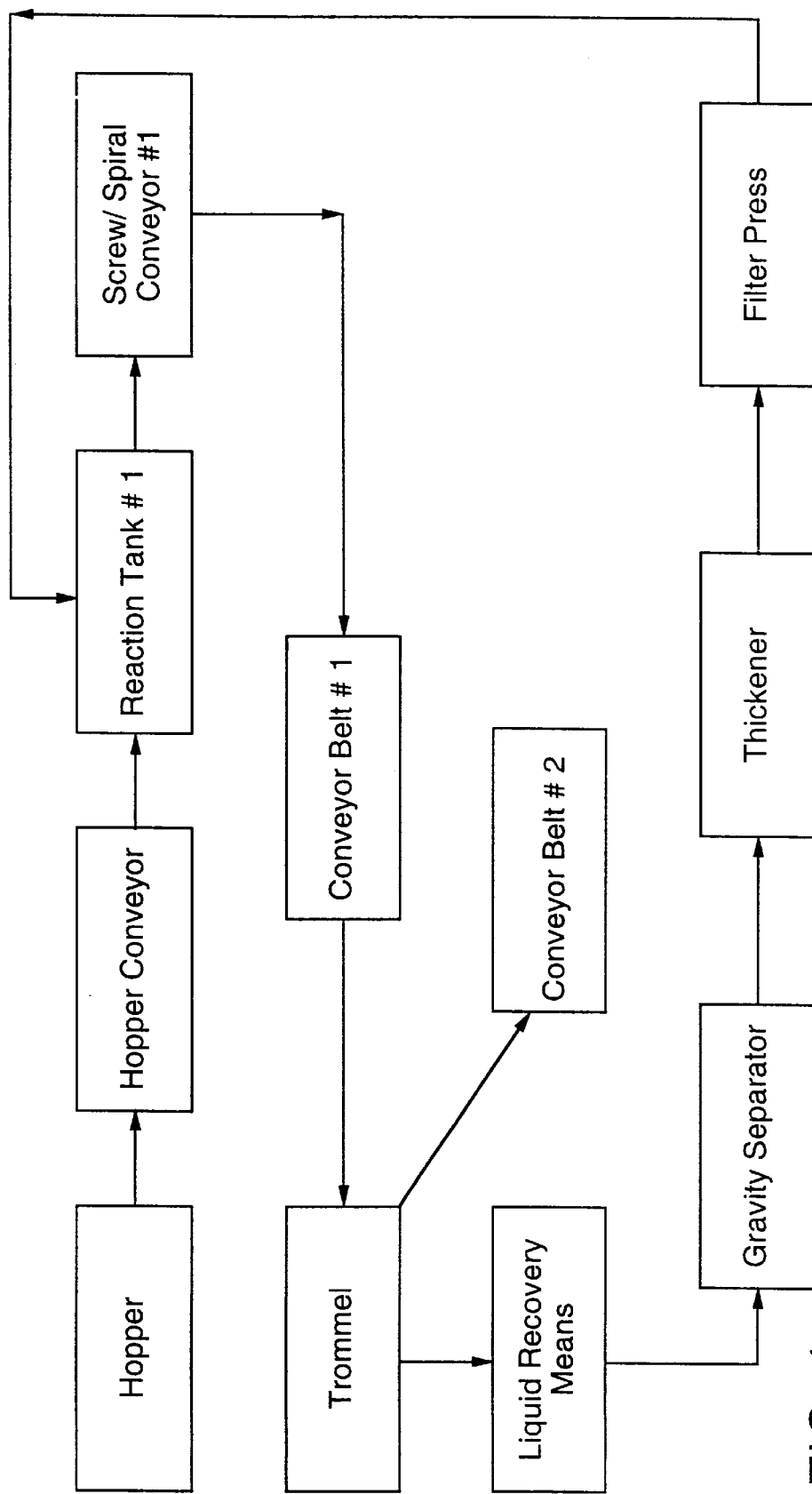
FIG. 1 is a schematic diagram of a first embodiment of a system for implementing the present chemical delacquering process.

The invention inheres in a delacquering composition, a method for using it, and a system including an array of equipment assembled to implement coating removal from aluminum and other substrates. Although the primary application of the delacquering composition and process is in the metals recycling area, alternatively, the delacquering composition, method and system can be used to remove coatings from a variety of metal and non-metal substrates. Similarly, the delacquering composition may be used to remove coatings from substrates other than those intended for recycling. In the recycling context, however, the environmental and yield advantages of using the present composition and system to delacquer coated metals are most evident.

The most preferred embodiment of the present invention embraces a delacquering system in which the delacquering solution is an aqueous. solution containing about 2–4% by weight citric acid and about 2–4% by weight lactic acid, together with an optional surfactant but without the presence of any other polymeric constituents such as polyethylene glycol. It should be borne in mind that organic acids may themselves form intrinsic polycarboxylic acid polymers of some sort, in aqueous solution, and it is not the intention of this specification to exclude the presence of such polycarboxylic acid polymers from the present composition in identifying the need for other components to be nonpolymeric and/or present in very small amounts (i.e., surfactants). In its broadest sense, however, the present delacquering composition is an aqueous solution containing at least one short-chain organic acid, and preferably a mixture of two short-chain organic acids, in the amount by weight of 0.5–8% each, preferably about 4–8% for a single organic acid and about 2–4% each for two different short chain organic acids. By "short-chain," a chain length of 2–12 carbon atoms, preferably 3–8 carbon atoms, and most preferably 3–6 carbon atoms is intended. If three or more short-chain organic acids are combined in the delacquering composition, the total amount of organic acid should be on the order of 4–8%. As to all of the percentage inclusions of organic acids, moreover, it should be recognized that the upper limits are commercially determined; higher organic acid percentages than those described above will still result in a functional delacquering composition and system, but the costs become prohibitive as unnecessarily high percentages of organic acids are used. An alternate embodiment of the invention employs about 2–4% by weight acetic acid and about 2–4% by weight lactic acid in combination in an aqueous system, together with an optional surfactant. A further alternate embodiment of the invention employs about 2–4% by weight of malic acid and about 2–4% by weight of lactic acid in combination in an aqueous system, together with an optional surfactant. Other organic acid combinations within the described short-chain length will be readily apparent to one skilled in the art.

Small amounts of surfactant may be included in the present composition. Suitable surfactants include, without limitation, sodium lauryl sulfate or any of many well-known surfactants, or commercial surfactants or wetting agents such as Triton® X100, which is (p-t-Octylphenoxy) polyethoxyethanol. Generally, surfactant will be included in the composition in amounts ranging from about 0.01–2%, with a maximum of 1% surfactant inclusion being preferred. Because surfactants are themselves polymers in some instances, the limitation of the amount of the surfactant component is necessary to avoid the polymer decomposition disadvantages discussed above.

Coatings susceptible to delacquering by the present compositions and methods include common can coatings in the food and beverage industry. These coatings are exemplified by lacquers, coatings and paints including but not limited to alkylamides, polyesters, polyolefins including low and high density polyethylene and polyethylene copolymers and polypropylene polymers, epoxies, polyvinylchloride polymers, natural and synthetic varnishes, polyurethanes, polyacrylic polymers, and polybutylene and polycarbonate coatings or laminate layers. These materials may be present singly or in combination in blends, laminates or other combinations and configurations.

Delacquering is realized when the present compositions are contacted onto coated aluminum (or other coated substrates) with application of heat and agitation. Processing temperatures range from 160–212° F., preferably 180–212° F., and most preferably 185–212° F. (higher temperatures may be used in pressurized reactors, although pressurized reactors are not generally necessary). The shredded mixed UBCs or other substrate to be chemically delacquered are contacted with the composition and, before, during or after heating, preferably are stirred, drummed or otherwise agitated to facilitate coating removal. Processing times range from about 12–120 minutes (larger batch sizes require shorter times, as discussed infra.) and commercial processing times will often fall within the preferred range of 30 minutes to 1 hour. Coatings treated with the present composition and method do not generally dissolve but usually delaminate into large flecks or small sheets of coating material, which may in turn be filtered from the treating composition.

In theory, without intention of being bound thereby, short-chain organic acids are able to delacquer aluminum and other substrates in part because their small size allows them to diffuse into the pores of the coating. Moreover, and again in theory, the applications of these small molecules under heated conditions means that the metal pores will be relatively expanded in size, allowing further diffusion of the organic acid molecules. By infiltrating the coating pores, the organic acids are able to separate the coatings from the metal surfaces without having to dissolve the coatings themselves. It has been observed, also, that the "two acid" combination embodiments of the invention are best able to remove both the inner and outer UBC coatings as contrasted with the use of a single acid. It is believed, without intention of being bound thereby, that the inner UBC coatings—which are one-third to four times again as thick as the outer UBC coatings—are more susceptible to a combination of short chain organic acids than to a single acid. This belief is based upon empiric data and the mechanism is not known.

Substrates other than shredded mixed UBCs include, without limitation, coated aluminum finstock, coated aluminum lithographic sheets (litho sheets), and auto scrap. Aluminum finstock is the material used, for example, in heat exchange units such as automobile radiator "fins," which are manufactured from a specially coated aluminum material. Litho sheets are often aluminum sheets coated or laminated with polymers or coatings and, post-consumer, leftover ink from the printing process. Auto scrap represents relatively thicker metal materials bearing paints and coatings, which paints and coatings nonetheless need to be removed prior to metal recycling. As a general proposition, the present delacquering compositions and methods are relatively less suited for use on copper than on other metals.

Although the present process and system is useful to delacquer coated metal, it should be borne in mind that an expansive understanding of "coated metal" is meant. Coated metal includes laminated metal and any combination of paint or polymer layers or other multilayer constructs in which the metal is present in at least one layer and the paint, polymer, coating or other material is present in at least one layer. The laminates may moreover be formed by means other than coating the metal, including for example extrusion of layers and subsequent bonding. A coated metal might therefore be a metal sheet having a bonding agent layer between the metal and a polymer layer, or might take on many other configurations. The present method and process is able to remove paints, polymers or coatings from coated metals of many types including these and other laminates as described.

The present composition and system impart particular benefits to the delacquering of auto scrap as follows. Auto scrap does not represent a homogeneous material and recycling it requires initial separation among the different underlying metal materials. To facilitate commercial feasibility, such a separation process should be susceptible of automation. In tests conducted during the development of this invention, it was discovered that not only are the present compositions effective to delacquer auto scrap but, in addition, the acids create a distinctive, optically-discernible etching pattern, unique to many metal types, on the delacquered surface. As a result, when the present composition and system are used to delacquer auto scrap, the delacquered scrap pieces can be "tagged" with the distinctive etching pattern identifying the type of metal, which in turn allows optical sensors to govern an automated metal separation process.

Reaction vessels or treatment tanks for conducting the present process can generally be constructed of any sturdy, chemically inert material. A good material choice for a reaction vessel according to the present invention is "304 stainless steel," which represents a medium corrosion resistant stainless steel. Stainless steels with higher corrosion resistance than 304 stainless are not necessary. Other materials suitable to contain the reaction according to the present invention include, without limitation, polytetrafluoroethylene (Teflon®), ceramic, copper or copper alloys, specialty polycarbonate or other heat-resistant, corrosion-resistant polymers or copolymers. It is preferred that the reaction vessels/treatment tanks for use in the present invention not be constructed of aluminum.

In preferred practice, the least possible amount of treating solution is used to treat the maximum possible scrap or substrate to be delaminated. For shredded mixed UBCs, the optimal loading is about 1 pound of coated material per gal. of delacquering solution, with the outside ranges being defined as 0.2–1.2 pounds/gal., more preferably 0.5–1.0 pounds/gal. and most preferably 1 pound per gal. It is physically very difficult to immerse more than 1 pound of shredded mixed UBCs in 1 gal. of solution, as a matter of sheer space and packing volume. One skilled in the art can readily accommodate this guideline to other substrates. For example, much higher loadings on a weight basis can be effected for materials denser than shredded, mixed UBCs and, conversely, only lower loadings can be effected for materials having lower densities than UBCs.

Agitation can play an important role in the practice of the invention. The more the coated substrate is agitated during exposure to the delacquering composition, the faster the coating is separated from the substrate. Agitation is preferentially created by fluid flows, such as water injection, air injection, delacquering fluid injection, and/or steam injection. Because the present delacquering compositions are used at elevated temperatures, steam injection is a particularly appropriate means for mixing the substrate and the treating composition. Drum rolling and/or tumbling in a trommel are also appropriate methods for agitating the combined substrate and delacquering composition.

Figure 2:
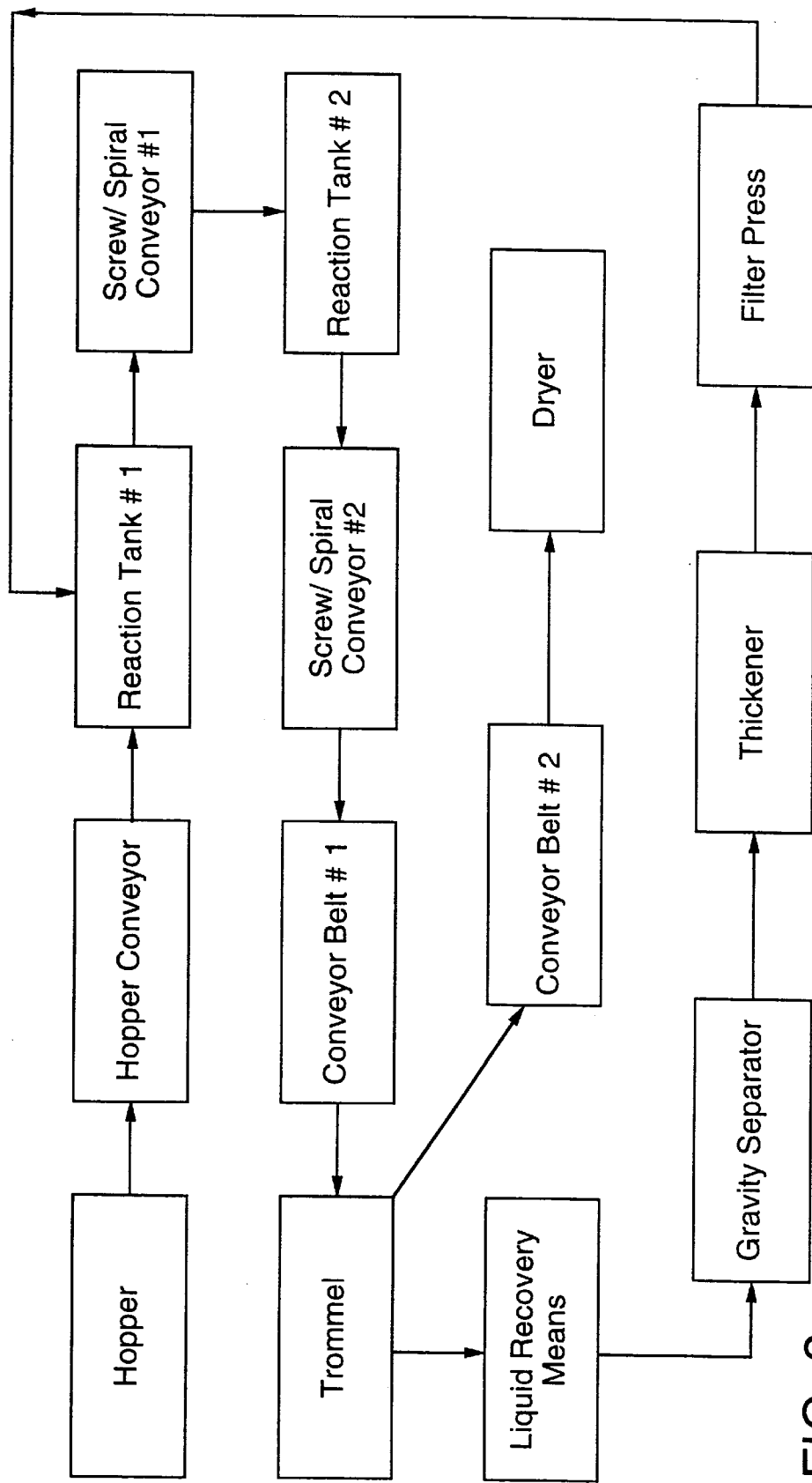
FIG. 2 is a schematic diagram of an alternate (augmented) embodiment of the system of FIG. 1.

The invention embodies both the present aqueous delacquering composition and various methods for using it, including but not limited to the systems disclosed in FIGS. 1 and 2. In FIG. 1, UBCs enter a (cone-bottomed) Reaction Tank #1 via a hopper and hopper conveyer. The UBCs are contacted with the delacquering composition, heated and mixed prior to being released into the Screw/Spiral Conveyer #1. After treatment, the resultant slurry is transported by Screw/Spiral Conveyer #1 onto a Conveyer Belt #1 and through a trommel. The trommel is perforated and fresh water is contacted thereon to rinse the UBCs, which are then further conveyed on Conveyer Belt #2 for further recycling. A liquid recovery means beneath the trommel collects both the spent delacquering composition and the fresh water from the trommel, and the combined liquids thus generated are recirculated to a gravity separator, a Thickener and a filter press. Recirculating liquid exiting the Thickener is conformed to the original acid and water composition of the starting treating delacquering composition, or other desired concentration, and is recycled into the Reaction Tank #1. Agitation in the reaction tank may be created by any means included but not limited to axial stirring (not preferred), water currents, steam injection, air injection or combinations thereof. Heating of the contents of the reaction tanks is generally accomplished either with steam injection and/or with a steam jacket surrounding the reaction tanks. The gravity separator generally recovers flakes, foils or sheets of coatings, inasmuch as the UBC coatings do not generally dissolve. Any smaller particulates generated from the coating are captured in the filter press 30. The equipment identified in FIG. 1 is all "off-the-shelf" industrial equipment and individual components have not been customized for the purpose of the practice of the present invention. However, it is believed that the combination of the components, in connection with the practice of the invention, is novel.

FIG. 2 illustrates an augmented embodiment of the present system in that a second reaction tank, Reaction Tank #2, is added, together with Screw/Spiral Conveyor #2, downstream of Reaction Tank #1. These additional features are by no means necessary to the practice of the invention but are beneficial in certain circumstances where longer treating times and/or additional agitation are desired. FIG. 2 also shows the presence of a dryer as the final element of the system; the dryer is optional and does not appear in FIG. 1.

Even though agitation becomes more difficult to realize in scaled-up operations, the larger the reaction tank the less agitation is needed. The following phenomenon may explain why delacquering proceeds more quickly in larger volumes than, say, in laboratory experiments. In the laboratory, small amounts of scrap to be delacquered undergo a certain amount of jostling during agitation. At the magnitude of a pilot or commercial plant, however, the presence of additional materials probably contributes to enhanced agitation among the metal scrap. Undoubtedly also the greater pressures exerted from large quantities of agitated UBCs exceed those which are achieved in the laboratory. For the purpose of the following examples, therefore, it should be borne in mind that for scaled-up operations, the processing times are shorter than those attributable to smaller-scale or laboratory trials. Analogously, in scaled-up operations, the use of lower acid concentration(s) than are documented in some of the following examples is therefore feasible, and/or the results obtained with the represented acid concentrations are improved, when greater agitation is exerted.

Without intention of being limited thereby, therefore, the following examples are illustrative.

EXAMPLE 1

A stainless steel laboratory vessel having a two gals. capacity was charged with one gal. of an aqueous composition containing 83% deionized water, 8% citric acid, 8% dl-lactic acid and 1% Triton® X100 ((p-t-Octylphenoxy) polyethoxyethanol) surfactant. The vessel was heated on a hot plate for a period of time sufficient to bring the solution to 212° F. One pound of shredded mixed UBCs was added to the boiling aqueous composition and agitated with stirring for 30 minutes. The shredded mixed UBCs were successfully delacquered.

EXAMPLE 2

Shredded mixed UBCs were delacquered according to Example 1 except that the delacquering composition contained 95% deionized water and 5% of a lactic acid solution containing 90% dl-lactic acid, glacial acetic acid and sodium chloride. The UBCs were treated at 180° F. for 60 minutes. Removal of exterior coatings of the UBCs was achieved.

EXAMPLE 3

Example 1 was repeated using a delacquering composition containing 10% citric acid monohydrate and 90% deionized water. The delacquering solution was maintained at 180° F. with agitation. After 20 minutes and 60 minutes, delacquering was observed.

EXAMPLE 4

Example 1 was repeated with the delacquering composition containing 96% tap water and 4% of a 90% solution of dl-lactic acid. The UBCs were contacted with the composition at 212° F. for 30 minutes, after which delacquering was observed.

EXAMPLE 5

The process according to Example 1 was repeated with a delacquering composition containing 96% RealLemon® juice and 4% of a 90% solution of dl-lactic acid. The UBCs were contacted with the delacquering solution with agitation at 212° F. for 30 minutes. Successful delacquering was achieved.

EXAMPLE 6

The process according to Example 5 was repeated with a delacquering composition containing 96% RealLemon® juice and 4% of a 90% solution of dl-lactic acid. The process was conducted at 212° F. for 30 minutes. Instead of treating 1 pound of shredded mixed UBCs, however, a pound of shredded beer can ends and shredded finstock, mixed, was successfully delacquered.

EXAMPLE 7

The process according to Example 1 was repeated with the delacquering composition containing 91% deionized water, 4% of a 90% solution of dl-lactic acid and 5% citric acid monohydrate. UBCs, beer can ends and finstock scrap were all successfully delacquered after treatment at 212° F. for 30 minutes using this composition.

EXAMPLE 8

UBCs were successfully delacquered according to the process of Example 1 with each of the following solutions, temperatures and times:

a) 8% of a 90% solution of dl-lactic acid, 8% citric acid monohydrate, 84% deionized water at 230° F. (in a retort) for 60 minutes;
b) 8% of a 90% solution of dl-lactic acid, 8% citric acid monohydrate, 84% deionized water at 212° F. for 30 minutes;
c) 8% of a 90% solution of dl-lactic acid, 8% citric acid monohydrate, 2% Citral (2% pure citrus oil), 82% deionized water at 212° F. for 30 minutes;
d) 8% of a 90% solution of dl-lactic acid, 8% citric acid monohydrate, 2% Bio T200A (commercial cleaner), 82% deionized water at 212° F. for 30 minutes;
e) 8% of a 90% solution of dl-lactic acid, 8% citric acid monohydrate, 1% Triton® X100, 83% deionized water at 212° F. for 30 minutes;
f) 8% of a 90% solution of dl-lactic acid, 8% citric acid monohydrate, 2% Citral (2% pure citrus oil), 1% Triton® X100, 89% deionized water at 212° F. for 30 minutes;
g) 8% of a 90% solution of dl-lactic acid, 8% citric acid monohydrate, 84% deionized water at 212° F. for 30 minutes;
h) 8% of a 90% solution of dl-lactic acid, 8% citric acid monohydrate, 1% Triton® X100, 83% deionized water at 212° F. for 30 minutes;
i) 8% of a 90% solution of dl-lactic acid, 8% citric acid monohydrate, 1% Tween 80, 83% deionized water at 212° F. for 30 minutes;
j) 4% of a 90% solution of dl-lactic acid, 4% citric acid monohydrate, 1% Triton® X100, 91% deionized water at 212° F. for 30 minutes;
k) 4% of a 90% solution of dl-lactic acid, 96% RealLemon® Juice, at 212° F. for 30 minutes;
l) 4% of a 90% solution of dl-lactic acid, 4% citric acid monohydrate, 1% Triton® X100, 91% deionized water at 212° F. for 30 minutes;
m) 8% of a 90% solution of dl-lactic acid, 8% citric acid monohydrate, 1% Triton® X100, 83% deionized water at 212° F. for 30 minutes;
n) 4% of a 90% solution of dl-lactic acid, 4% citric acid monohydrate, 92% deionized water at 212° F. for 30 minutes;
o) 8% of a 90% solution of dl-lactic acid, 8% citric acid monohydrate, 1% Triton® X100, 83% deionized water at 212° F. for 30 minutes;
p) 4% of a 90% solution of dl-lactic acid, 4% citric acid monohydrate, 1% Triton® X100, 1% sodium citrate, 90% deionized water at 212° F. for 30 minutes;
q) 4% of a 90% solution of dl-lactic acid, 4% citric acid monohydrate, 1% Triton® X100, 5% sodium citrate, 86% deionized water at 212° F. for 30 minutes;
r) 8% of a 90% solution of dl-lactic acid, 8% citric acid monohydrate, 1% Triton® X100, 1% sodium citrate, 82% deionized water at 212° F. for 30 minutes;
s) 8% of a 90% solution of dl-lactic acid, 8% citric acid monohydrate, 1% Triton® X100, 5% sodium citrate, 78% deionized water at 212° F. for 30 minutes;
t) 4% of a 90% solution of dl-lactic acid, 4% citric acid monohydrate, 1% Triton® X100, 1% sodium phosphate monobasic, 86% deionized water at 212° F. for 30 minutes;
u) 4% of a 90% solution of dl-lactic acid, 4% citric acid monohydrate, 1% Triton® X100, 5% sodium phosphate monobasic, 86% deionized water at 212° F. for 30 minutes;
v) 8% of a 90% solution of dl-lactic acid, 8% citric acid monohydrate, 1% Triton® X100, 1% sodium phosphate monobasic, 82% deionized water at 212° F. for 30 minutes; and
w) 8% of a 90% solution of dl-lactic acid, 8% citric acid monohydrate, 1% Triton® X100, 5% sodium phosphate monobasic, 78% deionized water at 212° F. for 30 minutes.

EXAMPLE 9

Beer can ends were successfully delacquered according to the process of Example 1 with each of the following solutions, temperatures and times:

a) 8% of a 90% solution of dl-lactic acid, 8% citric acid monohydrate, 84% deionized water at 212° F. for 30 minutes;
b) 8% of a 90% solution of dl-lactic acid, 8% citric acid monohydrate, 1% Triton® X100, 83% deionized water at 212° F. for 30 minutes;
c) 8% of a 90% solution of dl-lactic acid, 8% citric acid monohydrate, 1% Tween 80, 83% deionized water at 212° F. for 30 minutes;
d) 4% of a 90% solution of dl-lactic acid, 4% citric acid monohydrate, 1% Triton® X100, 91% deionized water at 212° F. for 30 minutes;
e) 4% of a 90% solution of dl-lactic acid, 96% RealLemon® Juice, at 212° F. for 30 minutes;
f) 4% of a 90% solution of dl-lactic acid, 4% citric acid monohydrate, 1% Triton® X100, 91% deionized water at 212° F. for 30 minutes;
g) 8% of a 90% solution of dl-lactic acid, 8% citric acid monohydrate, 1% Triton® X100, 83% deionized water at 212° F. for 30 minutes;
h) 4% of a 90% solution of dl-lactic acid, 4% citric acid monohydrate, 92% deionized water at 212° F. for 30 minutes;
i) 8% of a 90% solution of dl-lactic acid, 8% citric acid monohydrate, 1% Triton® X100, 83% deionized water at 212° F. for 30 minutes;
j) 4% of a 90% solution of dl-lactic acid, 4% citric acid monohydrate, 1% Triton® X100, 1% sodium citrate, 90% deionized water at 212° F. for 30 minutes;
k) 4% of a 90% solution of dl-lactic acid, 4% citric acid monohydrate, 1% Triton® X100, 5% sodium citrate, 86% deionized water at 212° F. for 30 minutes;
l) 4% of a 90% solution of dl-lactic acid, 4% citric acid monohydrate, 1% Triton® X100, 1% sodium phosphate monobasic, 86% deionized water at 212° F. for 30 minutes;
m) 4% of a 90% solution of dl-lactic acid, 4% citric acid monohydrate, 1% Triton® X100, 5% sodium phosphate monobasic, 86% deionized water at 212° F. for 30 minutes;
n) 8% of a 90% solution of dl-lactic acid, 8% citric acid monohydrate, 1% Triton® X100, 1% sodium phosphate monobasic, 82% deionized water at 212° F. for 30 minutes; and
o) 8% of a 90% solution of dl-lactic acid, 8% citric acid monohydrate, 1% Triton® X100, 5% sodium phosphate monobasic, 78% deionized water at 212° F. for 30 minutes.

EXAMPLE 10

Beverage can ends were successfully delacquered according to the process of Example 1 with each of the following solutions, temperatures and times:

a) 8% of a 90% solution of dl-lactic acid, 8% citric acid monohydrate, 1% Triton® X100, 83% deionized water at 212° F. for 30 minutes;
b) 4% of a 90% solution of dl-lactic acid, 4% citric acid monohydrate, 1% Triton® X100, 91% deionized water at 212° F. for 30 minutes;
c) 8% of a 90% solution of dl-lactic acid, 8% citric acid monohydrate, 1% Triton® X100, 83% deionized water at 212° F. for 30 minutes;
d) 8% of a 90% solution of dl-lactic acid, 8% citric acid monohydrate, 1% Triton® X100, 5% sodium citrate, 78% deionized water at 212° F. for 30 minutes; and
e) 8% of a 90% solution of dl-lactic acid, 8% citric acid monohydrate, 1% Triton® X100, 5% sodium phosphate monobasic, 78% deionized water at 212° F. for 30 minutes.

EXAMPLE 11

A system containing the mechanical components illustrated in FIG. 1 was assembled and operated as follows. Truckload quantities of mixed shredded UBCs were transferred to a conveyer belt hopper and were transferred by conveyor belt to a cone-bottomed reaction tank fitted with a screw conveyer at the bottom of the cone. At the same time as 250 pounds per hour of shredded UBCs were fed into the reaction tank, 60 gals. per minute of a delacquering composition were recirculated within the reaction tank. The delacquering composition contained 3%±1% citric acid, 3%±1% lactic acid, remainder deionized water. The delacquering composition was heated to about 195° F. and the treating fluid and shredded UBCs were passed through the system as shown in FIG. 1, with filtering, thickening and recirculation of the delacquering composition and separation and removal of the delacquered UBCs and can coatings.

From the foregoing, it will be observed that numerous modifications and variations can be effected without departing from the true spirit and scope of the novel concept of the invention. It is to be understood that no limitation with respect to the specific embodiments disclosed herein is intended or should be inferred. The disclosure is intended to cover, by the appended claims, all such modifications as fall within the scope of the claims.

What is claimed is:

1. A process for removal of coatings from a coated metal substrate prior to the recycling of the coated metal substrate, comprising the steps of:

providing a coated aluminum or steel metal substrate selected from the group consisting of aluminum food containers, aluminum food container parts, aluminum beverage containers, steel food containers, steel beverage containers, aluminum finstock, aluminum lithographic sheet scrap, and automotive scrap, said coated aluminum or steel metal substrate having one or more coating compositions thereon wherein said coating composition is selected from the group consisting of alkylamides, polyesters, polyethylenes, polypropylenes, polyolefins, epoxies, polyvinylchloride polymers, natural varnishes, synthetic varnishes, polyuretanes, polyacrylic polymers, polybutylenes, and polycarbonates;

providing an aqueous solution consisting essentially of at least one organic acid in an amount between about 0.05–8% by weight, and water;

immersing said coated aluminum or steel metal substrate in said aqueous solution;

heating said aqueous solution; and removing said coatings from said coated metal substrate by contacting the coated aluminum or steel metal substrate with said at least one organic acid.

2. The process of claim 1 wherein the heating step results in heating of said aqueous solution to 160–212° F., and wherein said at least one organic acid contains between 2–12 carbons.

3. The process of claim 2 wherein said aqueous solution is heated to a temperature between 180–212° F. and wherein the process further includes a step of agitating said aqueous solution.

4. The process of claim 2 wherein said aqueous solution further includes up to about 2% by weight of a surfactant.

5. The process of claim 2 wherein said aqueous solution incorporates at least two organic acids, each having 3–8 carbon atoms.

6. The process of claim 2 wherein said coated aluminum or steel metal substrate is comprised substantially of used beverage containers.

7. The process of claim 3 wherein the aqueous solution is heated to 212° F.

8. The process of claim 5 wherein said aqueous solution comprises by weight between 83% and 99% water, between 0.5% and 8% citric acid, between 0.5% and 8% dl-lactic acid, and 1% surfactant.

9. The process of claim 8 wherein said surfactant is (p-t-Octylphenoxy)polyethoxyethanol.

10. The process of claim 7 wherein said agitating continues for a time of at least 30 minutes.

11. The process of claim 10 wherein said agitating is effected with fluid flows.

12. The process of claim 11 further comprising a step of separating said aqueous solution from said coated aluminum metal substrate after removal of the coating on said aluminum or steel metal substrate.

13. The process of claim 12 wherein said separating step further includes drying said coated aluminum or steel metal substrate.

14. The process of claim 13 further comprising a step of recovering the removed coatings.

15. The process of claim 13 wherein said coated aluminum or steel metal substrate further comprises at least one of aluminum lithographic sheet, aluminum automotive scrap, and coated finstock.

16. The process of claim 14 wherein the steps are practiced in either a batch process or a continuous process.

17. The process of claim 15 wherein said coated aluminum or steel metal substrate further includes more than one alloy of thin gauge aluminum stock.

* * * * *